United States Patent
Hasegawa et al.

(10) Patent No.: US 6,168,858 B1
(45) Date of Patent: Jan. 2, 2001

(54) MICROPOROUS POLYETHYLENE MEMBRANES HAVING LOW FUSING TEMPERATURES

(75) Inventors: Takuya Hasegawa; Takahiko Kondo, both of Yokohama (JP)

(73) Assignee: Asahi Kasei Kogyo Kabushiki Kaisha, Osaka (JP)

( * ) Notice: Under 35 U.S.C. 154(b), the term of this patent shall be extended for 0 days.

(21) Appl. No.: 09/077,943

(22) PCT Filed: Dec. 5, 1996

(86) PCT No.: PCT/JP96/03560

§ 371 Date: Jun. 5, 1998

§ 102(e) Date: Jun. 5, 1998

(87) PCT Pub. No.: WO97/20883

PCT Pub. Date: Jun. 12, 1997

(30) Foreign Application Priority Data

Dec. 5, 1995 (JP) .................................................... 7-339851

(51) Int. Cl.⁷ ................................ B32B 3/26; H01M 2/16
(52) U.S. Cl. ......................... 428/315.5; 428/913; 429/62; 429/145
(58) Field of Search ................................ 428/316.5, 913; 429/62, 145, 254; 210/500.36, 490; 521/64, 144; 526/348

(56) References Cited

U.S. PATENT DOCUMENTS

| | | |
|---|---|---|
| 4,331,622 | * 5/1982 | Doi et al. . |
| 4,731,304 | * 3/1988 | Lundquist et al. . |
| 5,036,148 | * 7/1991 | Chanzy et al. . |
| 5,115,067 | * 5/1992 | Yagi et al. . |
| 5,240,655 | * 8/1993 | Troffkin et al. . |
| 5,248,461 | * 9/1993 | Pluyter et al. . |
| 5,376,445 | * 12/1994 | Fortuin et al. . |
| 5,521,265 | * 5/1996 | Schottenberger et al. . |
| 5,618,642 | * 4/1997 | Samii et al. . |

FOREIGN PATENT DOCUMENTS

| | | |
|---|---|---|
| 683196 | 11/1995 | (EP) . |
| 1-92243 | * 4/1989 | (JP) . |
| 2-21559 | * 1/1990 | (JP) . |
| 5-25305 | * 2/1993 | (JP) . |
| 6-93130 | * 4/1994 | (JP) . |
| 6-345893 | * 12 1994 | (JP) . |
| 7309965 | 11/1995 | (JP) . |

\* cited by examiner

*Primary Examiner*—Timothy M. Speer
*Assistant Examiner*—Jason Savage
(74) *Attorney, Agent, or Firm*—Birch, Stewart, Kolasch & Birch, LLP

(57) ABSTRACT

A polyethylene microporous film which is composed of a linear copolymeric polyethylene having a melt index (MI) of less than 0.1 and a propylene unit content of 0.1 to 4 mol % and which has a fuse temperature of less than 136° C. A polyethylene microporous film which is composed of a mixture of a linear copolymeric polyethylene having a melt index (MI) of less than 0.1 and a propylene unit content of 0.1 to 4 mol % and a high density polyethylene having a comonomer unit content of less than 0.1 mol %, said mixture having a weight average molecular weight of 250,000 to 700,000 and a propylene unit content of 0.1 to 4 mol %, and which has a fuse temperature of less than 136° C.

8 Claims, No Drawings

MICROPOROUS POLYETHYLENE MEMBRANES HAVING LOW FUSING TEMPERATURES

This application claims the benefit under 35 U.S.C. §371 of prior PCT International Application No. PCT/JP96/03560 which has an International filing date of Dec. 5, 1996 which designated the United States of America, the entire contents of which are hereby incorporated by references.

TECHNICAL FIELD

This invention relates to a polyethylene microporous film, a separator composed thereof and a battery in which the same is used as a battery separator.

BACKGROUND ART

Polyethylene microporous films are used in micro filtration membranes, battery separators, condenser separators and the like. Among these uses, the use as a battery separator, particularly a separator for lithium ion cell, requires that the polyethylene microporous film exerts, in addition to general physical properties such as mechanical strength and film permeability, a so-called "fuse effect" such that when the inner part of the battery is overheated, the separator fuses to form a film, which covers the electrode, thereby cutting off the electric current to secure the safety of battery.

In the case of a polyethylene microporous film, it is known that the fuse temperature, namely the temperature at which the fuse effect is exerted, is about 130 to 150° C. Even when the inner part of a battery is overheated by any cause, the microporous film fuses upon reaching the fuse temperature to form a film with which the electrode is covered, so that the passage of ions is cut off and the cell reaction is stopped. However, when the temperature elevation is very rapid, the temperature in the inner part of battery is further elevated even after the polyethylene microporous film has fused, and consequently the film is broken, which causes a short in the battery in some cases, so that the development of a polyethylene microporous film having a lower fuse temperature has become a problem.

For example, JP-A-5-25,305 and JP-A-2-21,559 disclose a method for lowering the fuse temperature of a film by blending into an ultrahigh molecular weight polyethylene (UHMWPE) a branched, low-density polyethylene (LDPE) or a linear, low-density polyethylene (LLDPE). According to this method, the fuse temperature of the film can be expected to be lowered to some extent. On the other hand, however, the melt index (MI) is 0.1 to 100 which is very high as compared with UHMWPE and HDPE, so that there have been problems such as the mechanical strength and permeability of film are deteriorated, and when the amount of LDPE and LLDPE added is increased the film is not made porous. Moreover, the above method has had a problem in film productivity, such as at least one hour being required for dissolving the polymer by heating because UHMWPE having a low dissolvability is used as the essential component.

The object of this invention is to solve the above-mentioned problems and provide a polyethylene microporous film which is excellent in mechanical strength, permeability and productivity and has a low fuse temperature.

The present inventors have examined a linear copolymeric polyethylene having a much higher molecular weight than LLDPE which has been used in the prior art. As a result, it has been found that a linear copolymeric polyethylene can be made porous even when used alone and a polyethylene microporous film produced therefrom has a high strength and a low fuse temperature, which compares quite well with the prior art. However, such a film has not had a sufficient permeability for using as a separator as compared with a film produced from HDPE having a high molecular weight.

Therefore, a further examination has been made on the kind of a comonomer to be introduced as a monomeric unit into the linear copolymeric polyethylene, and the present inventors have surprisingly found that a microporous film composed of a linear copolymeric polyethylene in which propylene is used as the comonomer (referred to hereinafter as the C3 copolymer in some cases) is smaller in shrinkage than a microporous film composed of a copolymer in which butene-1 is used as the comonomer (referred to hereinafter as the C4 copolymer in some cases) and a microporous film composed of a copolymer in which other α-olefins are used, and has a sufficient permeability for using a separator.

The reason why the C3 copolymer specifically imparts a high porosity to the film has not been clarified, but it is considered that the methyl group which is the side chain of the C3 copolymer is easily incorporated into the crystals of the polymer as compared with an ethyl group and butyl group, so that it could be possible that the C3 copolymer has a crystalline structure close to HDPE in spite of being a copolymer, and exhibits a higher permeability than copolymers in which other comonomers are used such as the C4 copolymer.

Further, the present inventors have made extensive research to achieve a higher permeability and have consequently found that when the C3 copolymer is not used alone but used in admixture with a high density polyethylene, a higher permeability is obtained simultaneously with the same fuse temperature, and based on this knowledge, they have succeeded in producing a battery having more improved discharge characteristics and safety.

DISCLOSURE OF INVENTION

The first mode of this invention is a polyethylene microporous film which is composed of a linear copolymeric polyethylene having a melt index of less than 0.1 and a propylene unit content of 0.1 to 4 mol % and which has a fuse temperature of less than 136° C.

The second mode of this invention is a polyethylene microporous film which is composed of a mixture of a linear copolymeric polyethylene having a melt index of less than 0.1 and a propylene unit content of 0.1 to 4 mol % and a high density polyethylene having a comonomer unit content of less than 0.1 mol %, the above mixture having a weight average molecular weight of 250,000 to 700,000 and a propylene unit content of 0.1 to 4 mol % and which has a fuse temperature of less than 136° C.

The third mode of this invention is a separator composed of the above-mentioned polyethylene microporous film.

The fourth mode of this invention is a battery in which the above-mentioned separator is used as a battery separator.

BEST MODE FOR CARRYING OUT THE INVENTION

The melt indexes (MI) of the C3 copolymer and the mixture of the C3 copolymer and a high density polyethylene are less than 0.1, preferably less than 0.07 and more preferably less than 0.05. When the MI is 0.1 or more, it is difficult to make the film porous. As the C3 copolymer having such an MI and the above mixture, those having a weight average molecular weight of 200,000 to 4,000,000, preferably 250,000 to 700,000, and more preferably 250,000 to 500,000 are mentioned.

When the C3 copolymer is used alone, the weight average molecular weight thereof is 200,000 to 700,000, preferably 250,000 to 600,00, and more preferably 250,000 to 500,000.

The propylene unit content of the C3 copolymer is 0.1 to 4 mol %, preferably 0.2 to 3 mol %, and more preferably 0.5 to 2 mol %, based on the ethylene unit. When the propylene unit content is less than 0.1 mol % based on the ethylene unit, the lowering of the fuse temperature is insufficient, and when it exceeds 4 mol %, the crystallinity is lowered too much and it becomes difficult to make the film porous.

The density of the C3 copolymer is 0.85 to 0.97, preferably 0.90 to 0.96, and more preferably 0.92 to 0.95.

The C3 copolymer used in this invention can be produced by various known methods. For example, it can be produced by polymerization using a chromium compound-supported catalyst or magnesium compound-containing Ziegler catalyst as disclosed in JP-B-1-12,777.

Furthermore, in this invention, by mixing the above C3 copolymer with a high density polyethylene having a comonomer unit content of less than 0.1 mol % (referred to hereinafter as HDPE in some cases), the relation between permeability and fuse temperature can be improved more than when the C3 copolymer is used alone. The reason therefor has not be clarified; however, it is considered that when a mixture having a lowered comonomer concentration is used, which is prepared by uniformly dispersing the C3 copolymer having a high comonomer concentration in a high density polyethylene having a high porousness to dilute it, the relation between porousness and fuse effect can be better improved than when a C3 copolymer having the same comonomer concentration as the above mixture is used alone.

The weight average molecular weight of HDPE which can be mixed is 100,000 to 4,000,000, preferably 200,000 to 1,000,000, and more preferably 250,000 to 700,000.

The proportion of the C3 copolymer contained in the mixture is 1% to 100%, preferably 5% to 90%, and more preferably 10% to 80%. When the proportion of the C3 copolymer is less than 1%, it is difficult to obtain a sufficiently low fuse temperature.

The weight average molecular weight of the mixture is 250,000 to 700,000, preferably 250,000 to 700,000, and more preferably 250,000 to 500,000.

The propylene unit content of the C3 copolymer can be selected from the range of from 0.1 to 4.0 mol %; however, it is preferable to set, in anticipation of dilution with HDPE, a higher propylene unit content than when it is used alone.

An explanation is made below of the present process for producing the polyethylene microporous film.

The polyethylene microporous film is produced by dissolving polyethylene at a temperature not lower than its melting point in a solvent called a plasticizer, cooling the resulting solution to a temperature not higher than its crystallization temperature to produce a polymer gel, subjecting the polymer gel to film-formation (film-forming step), stretching the film obtained (the stretching step) and thereafter removing the plasticizer (the plasticizer-removing step).

The plasticizer referred to herein means an organic compound capable of forming a uniform solution of polyethylene at a temperature not higher than the boiling point of the plasticizer, and as specific examples thereof, there are mentioned decalin, xylene, dioctyl phthalate, dibutyl phthalate, stearyl alcohol, oleyl alcohol, decyl alcohol, nonyl alcohol, diphenyl ether, n-decane, n-dodecane, paraffin oil and the like. Among them, paraffin oil, dioctyl phthalate and decalin are preferred. The proportion of the plasticizer in the polymer gel is not particularly limited; however, it is 20% to 90%, preferably 50% to 70%. When the proportion of the plasticizer is 20% or less, it is difficult to obtain a microporous film having an appropriate porosity, and when it is 90% or more, the viscosity of a hot solution is lowered, which makes the continuous formation of a sheet difficult.

Hereinafter, the process for producing the polyethylene microporous film is divided into the film-forming step, the stretching step and the plasticizer-removing step and each is explained separately.

[Film-forming step]

The film-forming step is not particularly limited; however, for example, a sheet having a thickness of several tens of $\mu$m to several mm can be formed by feeding a linear copolymeric polyethylene powder and a plasticizer to an extruder, kneading the two at a temperature of about 200° C., and thereafter casting the mixture from a usual hanger coat die onto a cooling roll.

In carrying out this invention, an ultrahigh molecular weight polyethylene is not used as the essential component unlike prior techniques, so that no particular heating and dissolving equipment is required, a homogenous sheet can be prepared very simply by only feeding a polyethylene and a plasticizer to an extruder.

[Stretching step]

Subsequently, the sheet obtained is stretched at least monoaxially to form a stretched film. The stretching method is not particularly limited; however, a tentering method, a rolling method, a calendering method and the like can be used. Among them, simultaneous, biaxial stretching by a tentering method is preferred. The stretching temperature is a temperature ranging from room temperature to the melting point of the polymer gel, preferably 80 to 130° C, and more preferably 100 to 125° C. The stretching ratio is 4 to 400 times, preferably 8 to 200 times, and more preferably 16 to 100 times, as an areal ratio. When the stretching ratio is not more than 4 times, the strength as a separator is insufficient, and when it is not less than 400 times, not only is the stretching difficult, but also such adverse effects as the porosity of the microporous film obtained is low, and the like, tend to result.

[Plasticizer-removing step]

Subsequently, a microporous film is obtained by removing the plasticizer from the stretched film. The method of removing the plasticizer is not particularly limited. For example, when paraffin oil or dioctyl phthalate is used as the plasticizer, it is sufficient to extract the same with an organic solvent such as methylene chloride, methyl ethyl ketone or the like. However, the solvent can be sufficiently removed by heating and drying the microporous film obtained at a temperature not higher than the fuse temperature thereof. Moreover, when, for example, a low-boiling point compound such as decalin or the like is used as the plasticizer, the solvent can be sufficiently removed by only heating and drying the microporous film at a temperature not higher than the fuse temperature thereof. In any case, it is preferable to remove the plasticizer while restraining the film by fixing the film or the like.

In order to improve permeability and enhance dimensional stability, the polyethylene microporous film obtained by the above-mentioned production process is, if necessary, subjected to heat treatment at a temperature not higher than the fuse temperature.

[Physical properties]

The thickness of the microporous film is 1 to 500 μm, preferably 10 to 200 μm, and more preferably 15 to 50 μm. When the film thickness is less than 1 μm, the mechanical strength of the film is not sufficient, and when the film thickness is more than 500 μm, it becomes difficult to miniaturize and save weight in the battery.

The porosity, which is used as a measure of porousness, and the gas transmission rate, which is used as a measure of permeability, are affected by the conditions in the plasticizer-removing step, so that in this invention, they are evaluated by numerical values obtained when the removal of plasticizer is effected by extraction with methylene chloride at ordinary temperature in the non-restraint state.

The porosity in this invention is 20 to 80%, preferably 35 to 50%. When the porosity is less than 20%, the permeability is not sufficient and when it is more than 80%, no sufficient mechanical strength is obtained.

The gas transmission rate in this invention is 10 sec to 6,000 sec, preferably 50 sec to 4,000 sec, and more preferably 100 sec to 2,000 sec. When the gas transmission rate is more than 6,000 sec the permeability is not sufficient, and when the gas transmission rate is less than 10 sec the pore diameter is too large, so that the above gas transmission rate is not desirable.

The diameters of pores in the microporous film are 0.001 to 0.3 μm, preferably 0.005 to 0.1 μm, and more preferably 0.01 to 0.05 μm. When the pore diameter is less than 0.001 μm, the permeability is not sufficient and when the pore diameter is more than 0.3 μm, cutting-off of electric current due to the fuse effect occurs late and besides a short circuit due to precipitated dendrites and degraded active substances is feared, so that a film having such fine pores is not suited for use as a battery separator.

This invention is further explained in more detail below by Examples, in which "part" is "part by weight" in all appearances.

The methods of testing the characteristics shown in the Examples are as follows:

(1) Film thickness

Determined by use of a dial gauge (Ozaki Sei-sakusho: PEACOCK No. 25).

(2) Porosity

A sample of 20-cm square was cut from a microporous film and the volume and weight thereof were determined, after which the porosity was calculated from the results obtained using the following equation: Porosity (%)=100× [volume (cm$^3$)−weight (g)/0.95]/volume.

(3) Sticking strength

Using a KES-G5 handy compressive tester manufactured by Katotech, a sticking test was conducted using a pin having a tip curvature radius of 0.5 mm at a sticking speed of 2 mm/sec and the maximum sticking load was determined as the maximum sticking strength (g). Also, a value obtained by multiplying the sticking strength by a value of 25 (μm)/film thickness (μm) was determined as a 25 μ-reduced sticking strength.

(4) Gas transmission rate

Measured by a Gurley densometer according to JIS-P-8117. Also, a value obtained by multiplying the gas transmission rate by a value of 25 (μm)/film thickness (μm) was determined as a 25-μ reduced gas transmission rate.

(5) Pore diameter

1) SEM method: Measured by a scanning type electron microscope.

2) Gas transmission method: The pore diameter of a microporous film can be calculated from porosity and gas transmission rate using the following equation by assuming the Kundsen flow in the determination of gas transmission rate:

Pore diameter (μm)=189×τ$^2$/{porosity (%)×25-μ reduced gas transmission rate (sec)} wherein the flexing rate τ of pore was made 2.0 as to all microporous films.

(6) Comonomer unit content

The comonomer unit content (mol %) is determined by multiplying by 100 the quotient obtained by dividing the mole-reduced amount (A) of the integral value of signal strengths due to the comonomer unit by the sum of (A) and the mole-reduced amount (B) of the integral value of signal strengths due to ethylene unit in the $^{13}$C-NMR spectrum.

For example, when propylene is used as the comonomer, in the following structure model:

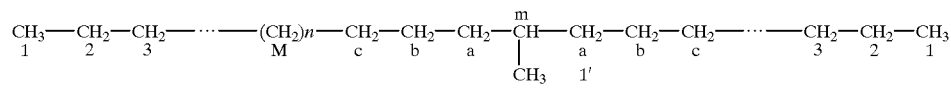

wherein $I_1$, $I_{1'}$, $I_2$, $I_3$, $I_a$, $I_b$, $I_c$ $I_m$ and $I_M$ represent the respective signal intensities resulting from the corresponding carbons in the $^{13}$C-NMR spectrum, Comonomer unit content (mol %)=(A)/[(A)+(B)]×100 wherein (A)=($I_{1'}$+$I_m$+$I_a$/2)/3

(B)=($I_1$+$I_2$+$I_3$+$I_M$+$I_a$/2+$I_b$+$I_c$)/2.

Therefore, the signal numbers $I_1$, $I_2$ and $I_3$ resulting from the terminal carbons are neglected and the above equation is arranged to obtain the following equation: Comonomer unit content (mol %)=$I_m$/[$I_m$+($I_M$+5$I_m$)/2]×100.

(7) Melt index

The melt index measured based on JIS K-7210 at a temperature of 190° C. under a load of 2.16 kg and was made MI. Incidentally, when MI becomes about less than 0.01 which is enough smaller than 0.1, variation tends to be caused in the measurement of MI, so that when the comparison of melt indexes is effected in more detail, HMI obtained by measurement under a load of 21.6 kg can be used together with the usually used MI (load: 2.16 kg).

(8) Fuse temperature

An electrolyte solution prepared by adding lithium borofluoride to a mixed solvent of propylene carbonate and butyrolactone (volume ratio=1:1) so that the concentration became 1.0M was used to impregnate therewith a polyethylene microporous film cut to a diameter of 16 mm, and this film was nipped by two sheets of a nickel-made electrode under a pressure of 20 kg/cm$^2$ and the impedance variation when the temperature was elevated from room temperature at a rate of 20° C./min was measured under the conditions of 1 V and 1 kHz. In this measurement, the temperature at which the impedance reached 1,000 Ω was determined as the fuse temperature.

(9) Overcharge test

A lithium ion cell was produced by using as a positive electrode a sheet obtained by mixing $LiCoO_2$ used as a positive active material, graphite and acetylene black used as conducting agents and fluororubber used as a binding agent, at a weight ratio of $LiCoO_2$ : graphite acetylene black : fluororubber=88:7.5:2.5:2, mixing dimethylformamide with the resulting mixture to prepare a paste, coating this paste on an Al foil and then drying the same; as a negative electrode a sheet obtained by mixing dimethylformamide with a mixture of needle cokes : fluororubber=95:5 weight ratio to prepare a paste, coating this paste on a Cu foil and then drying the same; and an electrolyte solution prepared by adding lithium borofluoride to a mixed solvent of propylene carbonate and butyrolactone (volume ratio=1:1) so that the concentration became 1.0M. This cell was charged at 4.2 V for 5 hours, and then further over-charged at constant current. The internal temperature of the cell was elevated by the overcharge and when the temperature reached the fuse temperature of a sample the electric current was cut off. Samples on which current return was not caused for at least 10 minutes thereafter ere evaluated as "O". Incidentally, the present test is n accelerated test, so that the test was conducted in such a state that a safety device with which the actual battery was provided such as PTC device or the like was removed.

EXAMPLE 1 (this invention)

Using a batch system melt kneading machine (Toyo Seiki: Laboplastomill), 40 parts of a C3 copolymer (density: 0.934, propylene unit content: 0.7 mol %) having an MI of 0.016, an HMI of 0.60 and a weight average molecular weight of 430,000, 60 parts of paraffin oil (Matsumura Sekiyu Kenkyusho: P350P) and 0.5 part of a thermal stabilizer (Ciba Geigy: Irganox 245) were kneaded at 200° C. at 50 rpm for 10 minutes. The resulting mixture was molded by a heated press at 200° C. and thereafter cooled by a water-cooled press to prepare an original sheet having a thickness of 1,000 μm. This original sheet was stretched 6×6 times at 115° C. by use of a simultaneous biaxial stretching machine (Toyo Seiki), and thereafter, the paraffin oil was removed by extraction with methylene chloride. Physical properties of the film obtained are shown in Table 1.

EXAMPLE 2 (this invention)

In the same manner as in Example 1, except that a C3 copolymer (density: 0.929, propylene unit content: 1.6 mol %) having an MI of 0.017, an MHI of 0.42 and a weight average molecular weight of 420,000 was used, a polyethylene microporous film was prepared. Physical properties of the film obtained are shown in Table 1.

EXAMPLE 3 (this invention)

In the same manner as in Example 1, except that a C3 copolymer (density: 0.931, propylene unit content: 1.9 mol %, provided measured by an IR spectrum) having an MI of less than 0.01, an HMI of 1.58 and a weight average molecular weight of 330,000 was used, a polyethylene microporous film was prepared. Physical properties of the film obtained are shown in Table 1.

EXAMPLE 4 (this invention)

In the same manner as in Example 1, except that a C3 copolymer (density: 0.930, propylene unit content: 1.8 mol %, provided measured by an IR spectrum) having an MI of less than 0.01, an HMI of 0.72 and a weight average molecular weight of 420,000 was used, a polyethylene microporous film was prepared. Physical properties of the film obtained are shown in Table 1.

EXAMPLE 5 (this invention)

In the same manner as in Example 1, except that a C3 copolymer (density: 0.933, propylene unit content: 1.6 mol %, provided measured by an IR spectrum) having an MI of less than 0.01, an HMI of 0.65 and a weight average molecular weight of 480,000 was used, a polyethylene microporous film was prepared. Physical properties of the film obtained are shown in Table 1.

EXAMPLE 6 (this invention)

In the same manner as in Example 1, except that a C3 copolymer (density: 0.929, propylene unit content: 1.9 mol %, provided measured by an IR spectrum) having an MI of less than 0.01, an HMI of 0.46 and a weight average molecular weight of 520,000, a polyethylene microporous film was prepared. Physical properties of the film obtained are shown in Table 1.

EXAMPLE 7 (comparison)

In the same manner as in Example 1, except that a C4 copolymer (density: 0.928, butene unit content: 1.3 mol %) having an MI of 0.013, an HMI of 0.54 and a weight average molecular weight of 400,000 was used, a polyethylene microporous film was prepared. Physical properties of the film obtained are shown in Table 1.

EXAMPLE 8 (comparison)

In the same manner as in Example 1, except that 40 parts of a high density polyethylene (density 0.956, comonomer unit content: 0.0 mol %) having an MI of 0.025, an HMI of 2.33 and a weight average molecular weight of 250,000 and 60 parts of paraffin oil (Matsumura Sekiyu Kenkyusho: P350P) were used, a polyethylene microporous film was prepared. Physical properties of the film obtained are shown in Table 1.

EXAMPLE 9 (comparison)

The same method as in Example 1, except that LLDPE (density: 0.917) having an MI of 0.4 was used and the extraction was conducted in the restraint state, was tried; however, the appearance of the film was transparent and no microporous film was obtained.

EXAMPLE 10 (comparison)

The same method as in Example 1, except that 40 parts of LDPE (density: 0.917) having an MI of 0.3 and 60 parts of paraffin oil (Matsumura Sekiyu: P350P) were used, was tried; however, the original sheet had too low a strength to be stretched.

EXAMPLE 11 (this invention)

A polyethylene microporous film was prepared in the same manner as in Example 1, except that 6 parts of a C3 copolymer (density: 0.929, propylene unit content: 1.6 mol %, provided measured by an IR spectrum) having an MI of 0.017 and a weight average molecular weight of 420,000, 34 parts of a high density polyethylene (density: 0.956, comonomer unit content: 0.0 mol %) having a weight average molecular weight of 250,000 and 60 parts of paraffin oil (Matsumura Sekiyu Seisakusho: P350P) were used and the stretching temperature was 120° C. Using the film obtained, the melt index (HMI) and propylene unit content of its polyethylene were measured. As a result, the HMI was 1.43 and the propylene unit content was 0.5 mol % (measured by an IR spectrum). Physical properties of the film obtained are shown in Table 2.

EXAMPLE 12 (this invention)

A polyethylene microporous film was prepared in the same manner as in Example 1, except that 12 parts of a C3 copolymer (density: 0.929, propylene unit content: 1.6 mol %, provided measured by an IR spectrum) having an MI of 0.017 and a weight average molecular weight of 420,000, 28 parts of a high density polyethylene (density: 0.956, comonomer unit content: 0.0 mol %) having a weight average molecular weight of 250,000 and 60 parts of paraffin oil (Matsumura Sekiyu Seisakusho: P350P) were used and the stretching temperature was 120° C. Using the film obtained, the melt index (HMI) and propylene unit content of its polyethylene were measured. As a result, the HMI was 1.46 and the propylene unit content was 0.8 mol % (measured by an IR spectrum). Physical properties of the film obtained are shown in Table 2.

EXAMPLE 13 (this invention)

A polyethylene microporous film was prepared in the same manner as in Example 1, except that 20 parts of a C3 copolymer (density: 0.929, propylene unit content: 1.6 mol %, provided measured by an IR spectrum) having an MI of 0.017 and a weight average molecular weight of 420,000, 20 parts of a high density polyethylene (density: 0.956, comonomer unit content: 0.0 mol %) having a weight average molecular weight of 250,000 and 60 parts of a paraffin oil (Matsumura Sekiyu Seisakusho: P350P) were used and the stretching temperature was 120° C. Using the film obtained, the melt index (HMI) and propylene unit content of its polyethylene were measured. As a result, the HMI was 0.96 and the propylene unit content was 0.9 mol % (measured by an IR spectrum). Physical properties of the film obtained are shown in Table 2.

EXAMPLE 14 (this invention)

A polyethylene microporous film was prepared in the same manner as in Example 1, except that 20 parts of a C3 copolymer (density: 0.925, propylene unit content: 1.9 mol %, provided measured by an IR spectrum) having a weight average molecular weight of 830,000, 20 parts of a high density polyethylene (density: 0.956, comonomer unit content: 0.0 mol %) having a weight average molecular weight of 250,000 and 60 parts of a paraffin oil (Matsumura Sekiyu Seisakusho: P350P) were used. Using the film obtained, the melt index and propylene unit content of its polyethylene were measured. As a result, the MI was less than 0.01, the HMI was 1.26 and the propylene unit content was 1.6 mol % (measured by an IR spectrum). Physical properties of the film obtained are shown in Table 2.

EXAMPLE 15 (this invention)

A polyethylene microporous film was prepared in the same manner as in Example 1, except that 20 parts of a C3 copolymer (density: 0.925, propylene unit content: 1.9 mol %, provided measured by an IR spectrum) having a weight average molecular weight of 830,000, 20 parts of a high density polyethylene (density: 0.962, comonomer unit content: 0.0 mol %) having a weight average molecular weight of 140,000 and 60 parts of a paraffin oil (Matsumura Sekiyu Seisakusho: P350P) were used. Using the film obtained, the melt index and propylene unit content of its polyethylene were measured. As a result, the MI was 0.019, the HMI was 3.26 and the propylene unit content was 1.8 mol % (measured by an IR spectrum). Physical properties of the film obtained are shown in Table 2.

EXAMPLE 16 (comparison)

The same method as in Example 1, except that 20 parts of a high density polyethylene (density: 0.956, comonomer unit content: 0.0 mol %) having a weight average molecular weight of 250,000, 20 parts of LLDPE (density: 0.917) having an MI of 0.4 and 60 parts of a paraffin oil (Matsumura Sekiyu Seisakusho: P350P) were used and the stretching temperature was 120° C., was tried; however, the film obtained was transparent and no microporous film was obtained.

EXAMPLE 17 (comparison)

The same method as in Example 1, except that 20 parts of a high density polyethylene (density: 0.956, comonomer unit content: 0.0 mol %) having a weight average molecular weight of 250,000, 20 parts of LDPE (density: 0.917) having an MI of 0.3 and 60 parts of paraffin oil (Matsumura Sekiyu Seisakusho: P350P) were used and the stretching temperature was 120° C., was tried; however, the film obtained was transparent and no microporous film was obtained.

EXAMPLE 18 (this invention)

Using a 35-mm twin-screw extruder, there were kneaded 20 parts of a C3 copolymer (density: 0.929, propylene unit content: 1.6 mol %, provided measured by an IR spectrum) having an MI of 0.017 and a weight average molecular weight of 420,000, 20 parts of a high density polyethylene (density: 0.956, comonomer unit content: 0.0 mol %) having a weight average molecular weight of 250,000, 60 parts of paraffin oil (Matsumura Sekiyu Seisakusho: P350P) and 0.1 part of an antioxidant (Ciba Geigy: Irganox 245) at 200° C. and then cast onto a cooling roll adjusted to a temperature of 30° C. from a hanger coat die having a lip space of 1,550 μm to prepare an original sheet having a thickness of 1,550 μm. This original sheet was continuously stretched 7×7 times at 120° C. using a simultaneous biaxial stretching machine and then subjected to extraction with methylene chloride to remove the paraffin oil, thereby obtaining a continuous film. Using the film obtained, the melt index (HMI) and propylene unit content of its polyethylene were measured. As a result, the HMI was 0.96 and the propylene unit content was 0.9 mol % (measured by an IR spectrum). Using this, a spiral lithium cell was prepared and subjected to an overcharge test. The results are shown in Table 3.

EXAMPLE 19 (comparison)

In the same manner as in Example 18, except that 40 parts of a high density polyethylene (density: 0.956, comonomer unit content: 0.0 mol %) having an MI of 0.025, an HMI of 2.33 and a weight average molecular weight of 250,000 was used, a continuous film was obtained. The results are shown in Table 3.

TABLE 1

|  |  | Example 1 (this invention) | Example 2 (this invention) | Example 3 (this invention) |
|---|---|---|---|---|
| Film thickness | (μm) | 23 | 21 | 27 |
| Porosity | (%) | 39 | 27 | 31 |
| Pore diameter | SEM method | 0.01 | 0.01 | — |
| (μm) | Gas transmission method | 0.015 | 0.007 | 0.005 |
| Sticking strength | (g/25 μ) | 720 | 700 | 450 |
| Gas transmission rate | (sec/25μ) | 1260 | 4000 | 4730 |
| Fuse temperature | (° C.) | 135 | 127 | 126 |
| Remarks |  | C3 | C3 | C3 |

|  |  | Example 4 (this invention) | Example 5 (this invention) | Example 6 (this invention) | Example 7 (comparison) | Example 8 (comparison) | Example 9 (comparison) | Example 10 (comparison) |
|---|---|---|---|---|---|---|---|---|
| Film thickness | (μm) | 24 | 24 | 24 | 25 | 22 | — | — |
| Porosity | (%) | 30 | 31 | 27 | 16 | 45 | — | 12 |
| Pore diameter | SEM method | — | — | — | 0.01 | 0.01 | — | — |
| (μm) | Gas transmission method | 0.005 | 0.008 | 0.008 | 0.002 | 0.037 | — | — |
| Sticking strength | (g/25 μ) | 560 | 580 | 610 | 640 | 520 | — | 410 |
| Gas transmission rate | (sec/25μ) | 5500 | 3030 | 4100 | 21000 | 450 | — | — |
| Fuse temperature | (° C.) | 129 | 133 | 129 | 120 | 137 | — | — |
| Remarks |  | C3 | C3 | C3 | C4 | HDPE | HDPE LLDPE 50% | HDPE LDPE 50% |

TABLE 2

|  |  | Example 11 (this invention) | Example 12 (this invention) | Example 13 (this invention) |
|---|---|---|---|---|
| Film thickness | (μm) | 23 | 24 | 18 |
| Porosity | (%) | 43 | 41 | 36 |
| Pore diameter | SEM method | 0.01 | 0.01 | 0.01 |
| (μm) | Gas transmission method | 0.036 | 0.032 | 0.028 |
| Sticking strength | (g/25 μ) | 510 | 480 | 530 |
| Gas transmission rate | (sec/25μ) | 490 | 570 | 760 |
| Fuse temperature | (° C.) | 135 | 134 | 132 |
| Remarks |  | HDPE C3 15% | HDPE C3 30% | HDPE C3 50% |

|  |  | Example 14 (this invention) | Example 15 (this invention) | Example 16 (comparison) | Example 17 (comparison) |
|---|---|---|---|---|---|
| Film thickness | (μm) | 27 | 25 | — | 12 |
| Porosity | (%) | 32 | 34 | — | — |
| Pore diameter | SEM method | — | — | — | — |
| (μm) | Gas transmission method | 0.009 | 0.010 | — | — |
| Sticking strength | (g/25 μ) | 760 | 670 | — | 410 |
| Gas transmission rate | (sec/25μ) | 2500 | 2200 | — | — |
| Fuse temperature | (° C.) | 133 | 133 | — | — |
| Remarks |  | HDPE C3 50% | HDPE C3 50% | HDPE LLDPE 50% | HDPE LDPE 50% |

TABLE 3

|  | Example 8 (this invention) | Example 19 (comparison) |
|---|---|---|
| Film thickness (μm) | 26 | 29 |
| Porosity (%) | 40 | 48 |
| Pore diameter (μm) |  | 0.01 |
| SEM method | 0.01 | 0.033 |
| Gas transmission method | 0.021 |  |
| Sticking strength (g) | 560 | 620 |
| Gas transmission rate (sec) | 920 | 480 |
| Fuse temperature (° C.) | 132 | 137 |
| Overcharge test 2A | ○ | x |
| 3A | ○ | x |
| Remarks | HDPE C3 50% | HDPE |

Industrial Applicability

The polyethylene microporous film of this invention is excellent in mechanical strength, transparency and productivity and simultaneously has a low fuse temperature, and therefore, particularly when it is used as a separator for battery such as lithium ion cell or the like, a battery having a high reliability can be prepared.

What is claimed is:

1. A polyethylene microporous film which is composed of a linear copolymeric polyethylene having a melt index (MI) of less than 0.1, and a propylene unit content of 0.1 to 4 mol %, wherein the polyethylene microporous film has a fuse temperature of less than 136° C., a thickness of 1 to 500 μm, a porosity of 20 to 80%, a pore diameter of 0.001 to 0.3 μm a sticking strength of 450 to 760 g/25 μ and a gas transmission rate of 10 to 6,000 sec.

2. The polyethylene microporous film according to claim 1, wherein the above linear copolymeric polyethylene has a weight average molecular weight of 250,000 to 700,000.

3. The polyethylene microporous film according to claim 2, wherein the above linear copolymeric polyethylene has a weight average molecular weight of 250,000 to 500,000.

4. A polyethylene microporous film which is composed of a mixture of a linear copolymeric polyethylene having a melt index (MI) of less than 0.1 and a propylene unit content of 0.1 to 4 mol % and a high density polyethylene having a comonomer unit content of less than 0.1%, said mixture having a melt index (MI) of less than 0.1 and containing 1.0% to 100% of said linear copolymeric polyethylene and which has a fuse temperature of less than 136° C.

5. The polyethylene microporous film according to claim 4, wherein the above mixture has a weight average molecular weight of 250,000 to 700,000.

6. The polyethylene microporous film according to claim 5, wherein the above mixture has a weight average molecular weight of 250,000 to 500,000.

7. A separator composed of the polyethylene microporous film according to claim 1.

8. A battery in which the polyethylene microporous film according to claim 1 is used as a battery separator.

* * * * *